US011122878B2

(12) United States Patent
Shami (10) Patent No.: US 11,122,878 B2
(45) Date of Patent: Sep. 21, 2021

(54) AUDIO CONTROLLED COSMETIC DEVICE (71) Applicant: FAROUK SYSTEMS, INC., Houston, TX (US)

(72) Inventor: Farouk M. Shami, Houston, TX (US)

(73) Assignee: FAROUK SYSTEMS, INC., Houston, TX (US)

(*) Notice: Subject to any disclaimer, the term of this patent is extended or adjusted under 35 U.S.C. 154(b) by 0 days.

(21) Appl. No.: 16/016,416

(22) Filed: Jun. 22, 2018

(65) Prior Publication Data

US 2019/0387860 A1     Dec. 26, 2019

(51) Int. Cl.
*A45D 20/12* (2006.01)
*B26B 19/20* (2006.01)
*G10L 15/22* (2006.01)
*A45D 2/00* (2006.01)
*A45D 44/00* (2006.01)
*A45D 7/02* (2006.01)

(52) U.S. Cl.
CPC .......... *A45D 20/12* (2013.01); *B26B 19/205* (2013.01); *G10L 15/22* (2013.01); *A45D 2/001* (2013.01); *A45D 7/02* (2013.01); *A45D 44/002* (2013.01); *A45D 2200/202* (2013.01); *G10L 2015/223* (2013.01)

(58) Field of Classification Search
CPC .. A45D 20/12; A45D 2200/202; A45D 2/001; A45D 7/02; A45D 44/002; B26B 19/20; G10L 15/22; G10L 2015/223

USPC ........................................................ 34/96, 283
See application file for complete search history.

(56) References Cited

U.S. PATENT DOCUMENTS

| 2005/0198853 | A1* | 9/2005 | Cafaro | A45D 20/10 34/96 |
| 2011/0063429 | A1* | 3/2011 | Contolini | A61B 17/00 348/77 |
| 2018/0027940 | A1* | 2/2018 | Goldman | A45D 20/12 |

FOREIGN PATENT DOCUMENTS

| CN | 1957796 A | * | 5/2007 |
| CN | 202436387 U | * | 9/2012 |

* cited by examiner

*Primary Examiner* — John P McCormack
(74) *Attorney, Agent, or Firm* — Polsinelli PC (57) ABSTRACT

A hair drying device is provided. The hair drying device includes a housing having an air inlet and an air outlet, a power component, a heating element coupled to the power component, an audio component configured to receive audio input and convert the audio input into audio data, a controller in communication with the heating element and the audio component, and a memory configured to store instructions executable by the controller. The instructions, when executed by the controller, are operable to receive the audio data from the audio component, determine that the audio data corresponds to a style setting, and adjust the energy provided by the power component to increase or decrease the heat emitted by the heating element based on the style setting.

18 Claims, 9 Drawing Sheets

AUDIO CONTROLLED COSMETIC DEVICE

FIELD

The present disclosure relates generally to cosmetic devices. In particular, the subject matter herein generally relates to audio controlled cosmetic devices.

BACKGROUND

Cosmetic devices, such as hair drying devices, styling irons, hair clippers, skin care devices, and so on, often have multiple settings for adjusting heat, power, speed, and the like. When a stylist provides cosmetic services to customers, the stylist often adjusts these settings to achieve a particular result (e.g., a haircut, a hair style, etc.) or to provide a particular treatment (e.g., skin care treatments). In the course of providing cosmetic services, stylists typically balance multiple cosmetic devices and may not have a free hand available. For example, the stylist may have a hair drying device in one hand and a brush in the other. In many cases, the stylist often sets one device down in order to adjust settings on another device. Accordingly, it may be inconvenient for the stylist to set one cosmetic device down to adjust settings on another cosmetic device.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, while specific details are set forth in order to provide an understanding of the examples described herein, it will be appreciated by those skilled in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connection can be such that the objects are permanently connected or releasably connected. The term "outside" refers to a region that is beyond the outermost confines of a physical object. The terms "comprising," "including" and "having" are used interchangeably in this disclosure. The terms "comprising," "including" and "having" mean to include, but not necessarily be limited to the things so described.

The present disclosure provides a cosmetic device which includes one or more device components. In operation, a user can adjust settings for these device components based on, for example, a hair type, skin type or a desired style. For example, the cosmetic device may be a hair drying device, a styling iron device, a hair clipping device, or a skin care device. In one embodiment, cosmetic device is a hair drying device that includes a power component with adjustable settings that change a temperature of air heated by a heating element and/or a motor to drive an impeller to propel air. To control the cosmetic device by audio commands, an audio component receives audio input generated by a user. The audio input is processed by the audio component to audio data which is transmitted to a controller. The controller compares the audio data to a style ledger to identify a match between the audio data and a particular style setting. Notably, some of the device components may be adjusted based on the particular style setting. In operation, the controller determines the audio data corresponds to the particular style setting and adjust one or more of the device components based on same. For example, the cosmetic device can include a hair dryer, and the audio input can include a voice command such as "fine hair" or "thick hair." The controller processes the audio input—here, the voice command—to determine audio data, and further determines the audio data corresponds to a style setting in the style ledger. The style ledger may include, for example, style settings that correspond to fine hair, thick hair, and so on. The controller further adjusts one of the device components, such as a power component, which, in turn, increases or decreases heat emitted by a heating element based on the style setting for fine hair or thick hair. As is appreciated by those skilled in the art, the style settings of style ledger can include programming instructions for adjusting one or more of the device components. In this fashion, the user does not have to set the cosmetic device aside, and manually adjust style settings, which provides for quicker and more efficient use of the cosmetic device.

Figure 1:
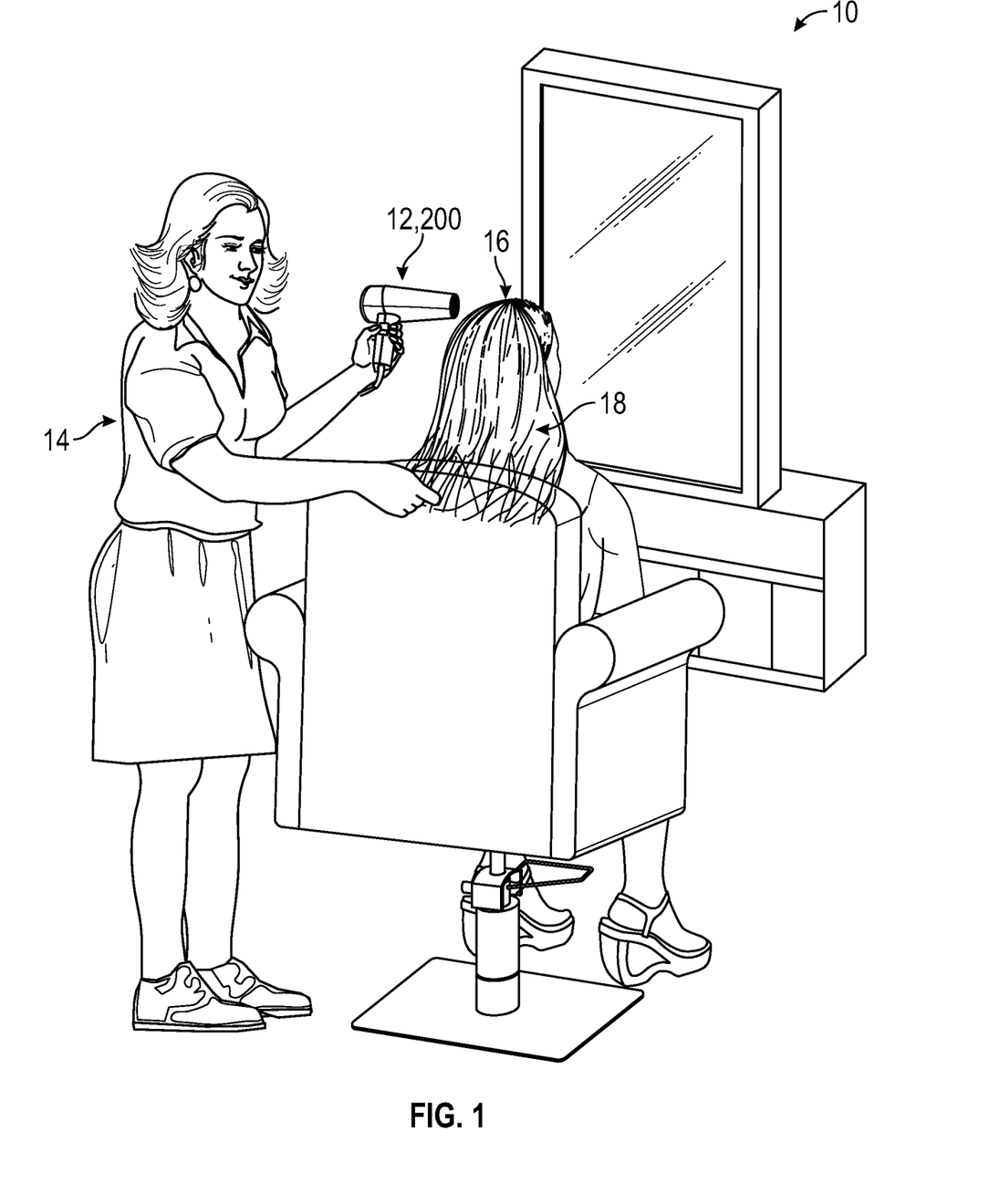
FIG. 1 is a schematic view of an exemplary salon environment, showing a stylist using a cosmetic device, in accordance with one or more embodiments of this disclosure.

Turning now to the figures, an exemplary environment utilizing a cosmetic device 12 is illustrated in FIG. 1. The cosmetic device 12, in the illustrated example, is a hair drying device 200. The cosmetic device 12 is used by a stylist 14 on a customer 16. In other examples, the customer 16 may be the user of the cosmetic device 12, for example at the customer's home without a separate user 14. In the illustrated example, the hair drying device 200 is being utilized to dry the hair 18 of the customer 16. One hand of the stylist 14 holds the cosmetic device 12. The other hand of the stylist 14 separates or styles the hair 18. As such, the stylist 14 does not have a free hand available to change the settings of the cosmetic device 12 without stopping the styling of the hair 18. As discussed in more detail below, the cosmetic device 12 can be any suitable device which is utilized to style or treat hair and/or skin. FIGS. 2A-5B illustrate different examples of cosmetic devices 12 and corresponding device components.

Figure 2A:
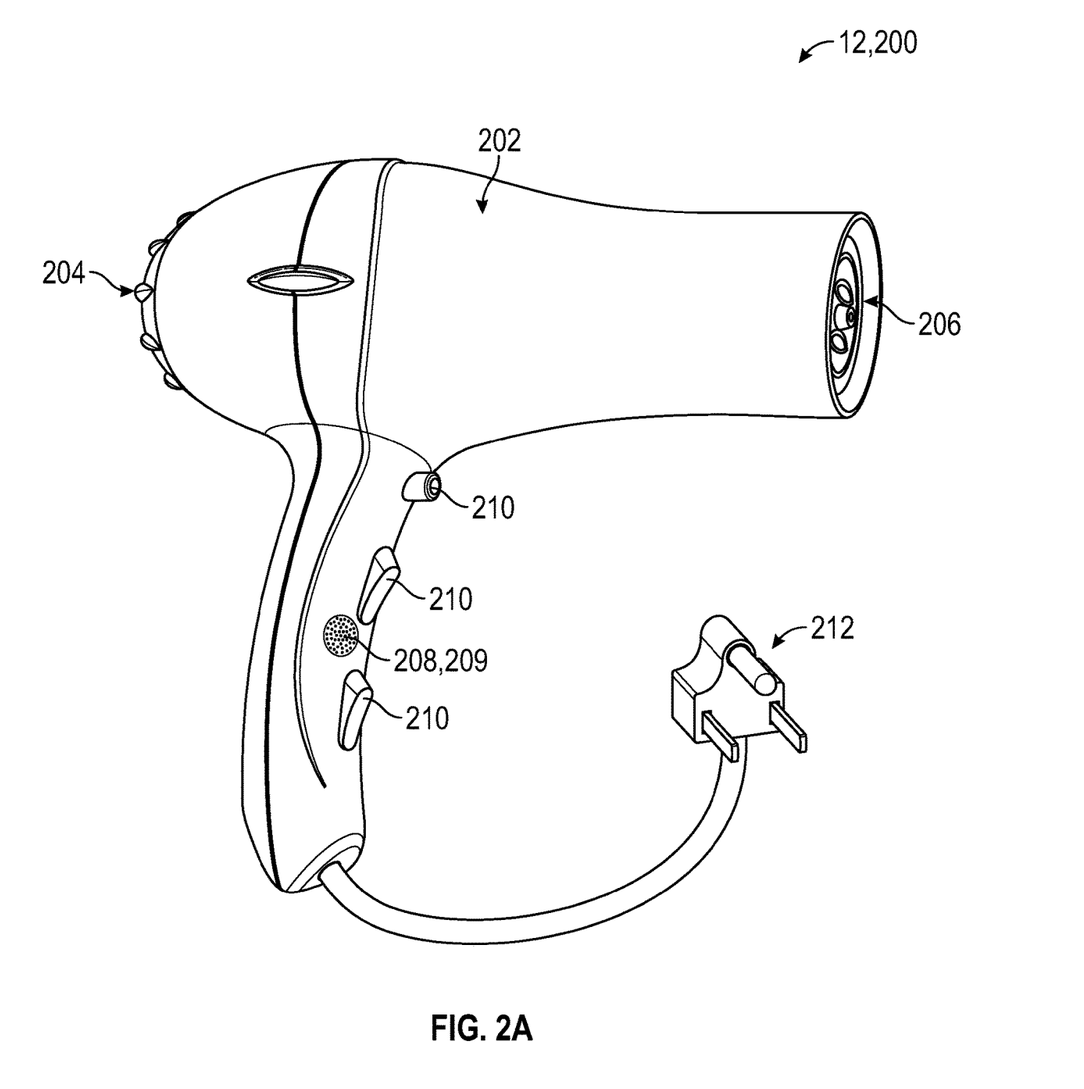
FIG. 2A illustrates an isometric view of an exemplary hair drying device shown in FIG. 1.

As illustrated in FIG. 2A, the cosmetic device 12 can be a hair drying device 200. The hair drying device 200 is configured to propel air heated to a temperature to dry hair. In some examples, the temperature can be predetermined. In at least one example, the hair drying device 200 may also emit ions to dry hair faster and/or to make hair healthier. The hair drying device 200 includes a housing 202 having an air inlet 204 and an air outlet 206. Air passes through the housing 202. The air enters the housing 202 through the air inlet 204 and exits the air outlet 206. The hair drying device 200 includes an audio component 208 configured to receive audio input and convert the audio input into audio data. In at least one example, the audio component 208 can be a microphone. In some examples, the audio component 208 can also include a speaker configured to emit a sound, such as confirmation and/or an error notification. While the audio component 208 is illustrated as a single component, it is appreciated it may can include multiple components (e.g., separate respective components for the speaker and the microphone).

The hair drying device 200 receives energy through a power component 212. The power component 212, as illustrated in FIG. 2A, includes a plug or a conduit which can be plugged into a power outlet (not shown). In other examples, the power component 212 can include a battery. The battery can be disposed in the housing 202 of the hair drying device 200.

As illustrated in FIG. 2A, the hair drying device 200 includes one or more physical controls 210, such as switches, buttons, touch screen displays, and/or any other suitable physical control to adjust the settings of the hair drying device 200. In at least one example, the hair drying device 200 may not include any physical controls 210 and may be controlled solely through the audio component 208.

Figure 2B:
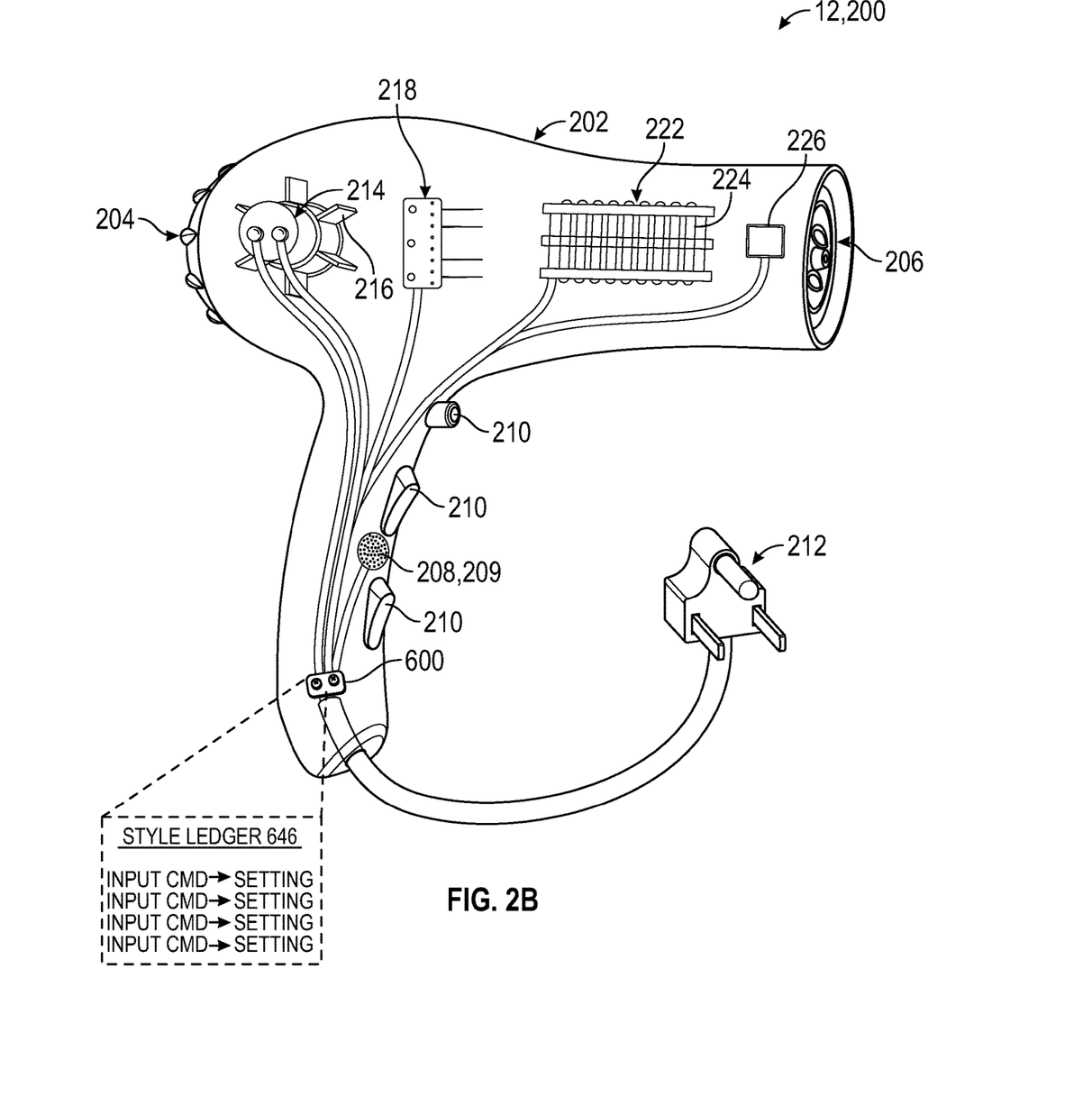
FIG. 2B illustrates an isometric view of the hair drying device of FIG. 2A, showing one or more internal components.

FIG. 2B illustrates a schematic view of the hair drying device 200 of FIG. 2A. The hair drying device 200 includes a motor 214 disposed within the housing. An impeller 216 is coupled to the motor 214, and the motor 214 is configured to rotationally drive the impeller to propel air from the air inlet 204 through the air outlet 206. The speed of the motor 214 determines the rotational speed of the impeller 216. As such, the speed of the motor 214 determines the speed of the air propelled through the air outlet 206.

The hair drying device 200 also includes a heating element 222 which is configured to emit or radiate heat into air passing between the air inlet and the air outlet such that the air is heated to a predetermined temperature. The heating element 222 is disposed in the housing 202 between the motor 214 and the air outlet 206. In at least one example, the heating element 222 can be disposed in the housing 202 between the air inlet 204 and the motor 214. The heating element 222 is coupled to the power component 212 and can include a wire 224. As illustrated in FIG. 2B, the wire 224 is in a coiled configuration. In at least one example, the wire 224 can be in a line configuration or any other suitable configuration to adequately emit heat to heat air to a predetermined temperature. The heating element 222 can include materials which heat when a current is passed through the heating element 222. For example, the heating element 222 can include nichrome, kanthal, cupronickel, metals, ceramic materials such as molybdenum disilicide, and/or polymeric materials.

Energy provided by the power component 212, such as an electric current, passes through the wire 224 and generates heat by resistive heating. By increasing the electric current provided by the power component 212 through the wire 224, a greater amount of heat is generated. Decreasing the electric current provided by the power component 212 through the wire 224 decreases the amount of heat generated. In other examples, the heating element 222 can include other components to emit heat by resistive heating, such as a heating plate and/or a core of heating material.

The hair drying device 200, in one or more examples, may include an ionic generator 218, which emits positive and/or negative ions. For example, ionic generator 218 may emit negative ions to divide water molecules (e.g., positively charged molecules in wet hair) into smaller particulates to improve evaporation. In operation, the motor 214 and/or ionic generator 218 emits negative ions by the ionic generator 218 and which are passed through the air outlet 206. Increasing the amount and/or concentration of negative ions emitted by the ionic generator 218 can decrease the time to dry hair. Decreasing the amount and/or concentration of negative ions emitted by the ionic generator 218 can increase the time to dry hair. In at least one example, the hair drying device 200 may not include an ionic generator 218.

The audio component 208, the power component 212, the motor 214, the ionic generator 218, and/or the heating element 222 are communicatively coupled to a controller 600. The controller 600 and corresponding operations are discussed in greater detail with reference to FIG. 6 (below). Notably, as shown here, controller 600 can access a style ledger 646, which may be stored in memory (e.g., in memory 640 discussed below). Style ledger 646 includes instructions related to settings or parameters for the motor 214, the ionic generator 218, and the heating element 222 based on each style setting in the style ledger 646. Based on the instructions corresponding to the style setting, the controller 600 can adjust one or more of the power component 212, the motor 214, the ionic generator 218, and the heating element 222 based on the style setting.

In operation, audio component 208 receives an audio input from a user (e.g., a voice command) and converts the audio input into audio data. The controller 600 receives the audio data from the audio component 208 and determines a corresponding style setting from style ledger 646. The style setting can include at least one of one or more specific temperatures, a change in temperature by a number of degrees, fine hair, medium hair, coarse hair, thick hair, straight hair, curly hair, wavy hair, long hair, short hair, an on state, an off state, and/or any other suitable style setting to control the hair drying device 200. The controller 600 can then adjust the energy provided by the power component 212 to increase or decrease the heat emitted by the heating element 222 based on the style setting. For example, the audio input may be "increase the temperature by 4 degrees." The audio component 208 converts the audio input into audio data, which is received by the controller 600. The controller 600 determines that the audio data corresponds to a style setting of a change in temperature by a number of degrees, and adjusts the energy provided by the power component to increase the heat emitted by the heating element 222 by 4 degrees. When the audio data corresponds to an invalid style setting, an error notification can be transmitted to the speaker 209 based on the invalid style setting. For example, the speaker 209 may emit a noise when the audio data corresponds to an invalid style setting. In other examples, when the audio data corresponds to an invalid style setting, a motor may be actuated to produce a vibration.

The style ledger 646 can also include other style settings, such as one or more specific motor speeds, and/or a change in motor speed by an amount. The controller 600 can then adjust the speed of the motor 214 to rotationally drive the impeller 216 based on the style setting.

In at least one example, the style ledger 646 can also include style settings, such as one or more specific concentration of ions, and/or a change in concentration in ions by an amount. The controller 600 can then adjust the ionic generator 218 to emit ions based on the style setting.

Style settings such as fine hair, medium hair coarse hair, thick hair, straight hair, curly hair, wavy hair, long hair, and short hair may include pre-programmed instructions, such as any combination of ion concentration, specific amount of ions, change in amount of ions, air temperature, and/or motor speed, which are predetermined for the type of hair.

One or more sensors 226 can also be disposed in the housing 202 of the hair drying device 200 to measure the temperature, speed, and/or concentration of ions in the air passing through the air outlet 206. The sensors 226 are communicatively coupled with the controller 600, and the controller 600 can adjust the motor 214, the ionic generator 218, and/or the heating element 222 until the motor speed, ion concentration, and/or air temperature is equal to the instructions based on the desired style setting.

Figure 3A:
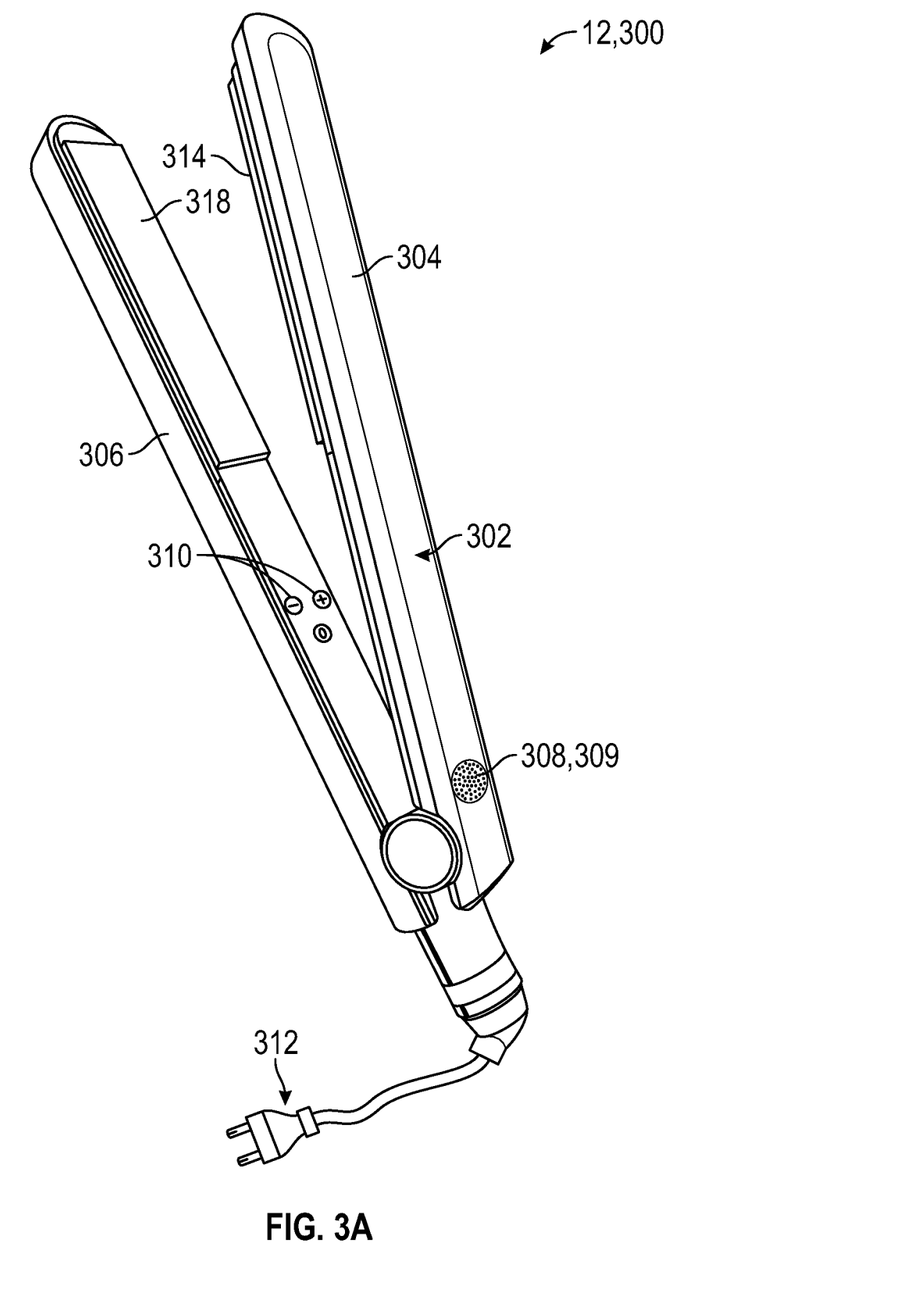
FIG. 3A illustrates an isometric view of an exemplary styling iron device.

As illustrated in FIG. 3A, the cosmetic device 12 can be a styling iron device 300, for example a straightening iron, a curling iron, or any other suitable heating iron which transfers heat to hair such that the hair can be styled as desired. The styling iron device 300 includes a housing 302. As illustrated in FIG. 3A, the styling iron device 300 includes a first portion 304 and a second portion 306. The first portion 304 includes a first styling plate 314, and the second portion 306 includes a second styling plate 318. The first and second styling plates 314, 318 transfer heat to hair such that the hair can be styled.

The styling iron device 300 includes an audio component 308 configured to receive audio input and convert the audio input into audio data. In at least one example, the audio component 308 can be a microphone. In some examples, the audio component 308 can also include a speaker configured to emit a sound, such as confirmation and/or an error notification. While the audio component 308 is illustrated as a single component, it is appreciated it may can include multiple components (e.g., separate respective components for the speaker and the microphone).

The styling iron device 300 receives energy through a power component 312. The power component 312, as illustrated in FIG. 3A, can include a plug or conduit which can be plugged into a power outlet. In other examples, the power component 312 can include a battery. The battery can be disposed in the housing 302 of the styling iron device 300.

As illustrated in FIG. 3A, the styling iron device 300 includes one or more physical controls 310. The one or more physical controls 310 can include switches, buttons, touch screen displays, and/or any other suitable physical control to adjust the settings of the styling iron device 300. In at least one example, the styling iron device 300 may not include any physical controls 310 and may be controlled solely through the audio component 308.

Figure 3B:
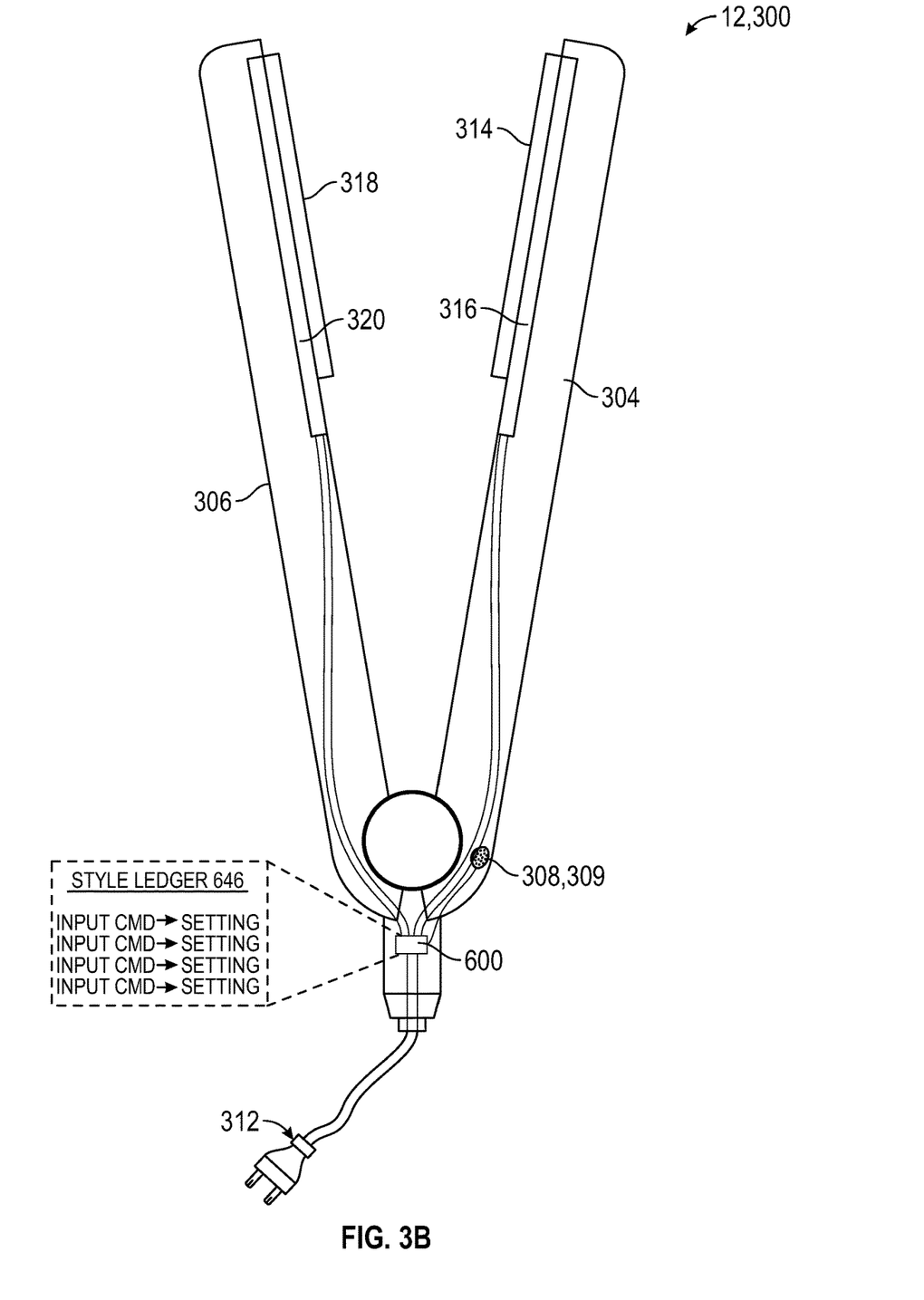
FIG. 3B illustrates a schematic view of the styling iron device of FIG. 3A, showing one or more internal components.

As illustrated in FIGS. 3A and 3B, the styling iron device 300 includes a first portion 304 and a second portion 306. The first portion 304 includes a first styling plate 314, and the second portion 306 includes a second styling plate 318. In at least one example, the styling iron device 300 can include only one styling plate, for example as with a curling iron. As illustrated in FIGS. 3A and 3B, the first and second styling plates 314, 318 are substantially flat and rectangular. In other examples, styling plates may be curved, cylindrical, undulating, and/or any desired shape. The first and second styling plates 314, 318 transfer heat to hair such that the hair can be styled.

The first and second styling plates 314, 318 can include any suitable material to adequately transfer heat, for example ceramics or ceramic coatings, metals, titanium, tourmaline, silicon, rubber, Teflon, and/or glass.

The styling iron device 300 includes a first heating element 316 and a second heating element 320 which corresponds with the first and second styling plates 314, 318. As with styling plates, the styling iron device 300 may include only one heating element, for example as with a curling iron. The first and second heating elements 316, 320 emit heat of a predetermined temperature to be transferred by the first and second styling plates 314, 318. The first and second heating elements 316, 320 are coupled to the power component 312. The first and second heating elements 316, 320 can include materials which heat when a current is passed through the first and second heating elements 316, 320. For example, the first and second heating elements 316, 320 can include nichrome, kanthal, cupronickel, metals, ceramic materials such as molybdenum disilicide, and/or polymeric materials.

Energy provided by the power component 312, such as an electric current, passing through the first and second heating elements 316, 320 generates heat by resistive heating. By increasing the electric current provided by the power component 312 through the first and second heating elements 316, 320, a greater amount of heat is generated. Decreasing the electric current provided by the power component 312 through the first and second heating elements 316, 320 decreases the amount of heat generated. In other examples, the first and second heating elements 316, 320 can include other components to emit heat by resistive heating, such as a heating plate and/or a core of heating material.

In at least one example, the first and second heating elements 316, 320 can include a wire, a plate, a core of heating material, or any other suitable material which can emit heat by resistive heating. The first and second heating elements 316, 320 can be in a coiled configuration. In at least one example, the first and second heating elements 316, 320 can be in a line configuration, a plate configuration, a cylindrical configuration, or any other suitable configuration to adequately emit heat of a predetermined temperature to heat hair.

The audio component 308, the power component 312, and/or the first and second heating elements 316, 320 are communicatively coupled to a controller 600. The controller 600 and corresponding operations are discussed in greater detail with reference to FIG. 6 (below). Notably, as shown here, controller 600 can access a style ledger 646, which may be stored in memory (e.g., in memory 640 discussed below). Style ledger 646 includes instructions related to settings or parameters for the first and second heating elements 316, 320 based on each style setting in the style ledger 646. Based on the instructions corresponding to the style setting, the controller 600 can adjust one or more of the power component 312 and the first and second heating elements 316, 320 based on the style setting.

In operation, audio component 308 receives an audio input from a user (e.g., a voice command) and converts the audio input into audio data. The controller 600 receives the audio data from the audio component 308 and determines a corresponding style setting from style ledger 646. The style setting can include at least one of one or more specific temperatures, a change in temperature by a number of degrees, fine hair, medium hair, coarse hair, thick hair, straight hair, curly hair, wavy hair, long hair, short hair, an on state, an off state, and/or any other suitable style setting to control the styling iron device 300. The controller 600 can adjust the energy provided by the power component 312 to increase or decrease the heat emitted by the first and second heating elements 316, 320 based on the style setting. For example, the audio input may be "increase the temperature by 4 degrees." The audio component 308 converts the audio input into audio data, which is received by the controller 600. The controller 600 determines that the audio data corresponds to a style setting of a change in temperature by a number of degrees, and adjusts the energy provided by the power component to increase the heat emitted by the first and second heating elements 316, 320 by 4 degrees. When the audio data corresponds to an invalid style setting, an error notification can be transmitted to the speaker 309 based on the invalid style setting. For example, the speaker 309 may emit a noise when the audio data corresponds to an invalid style setting. In other examples, when the audio data corresponds to an invalid style setting, a motor may be actuated to produce a vibration.

Figure 4A:
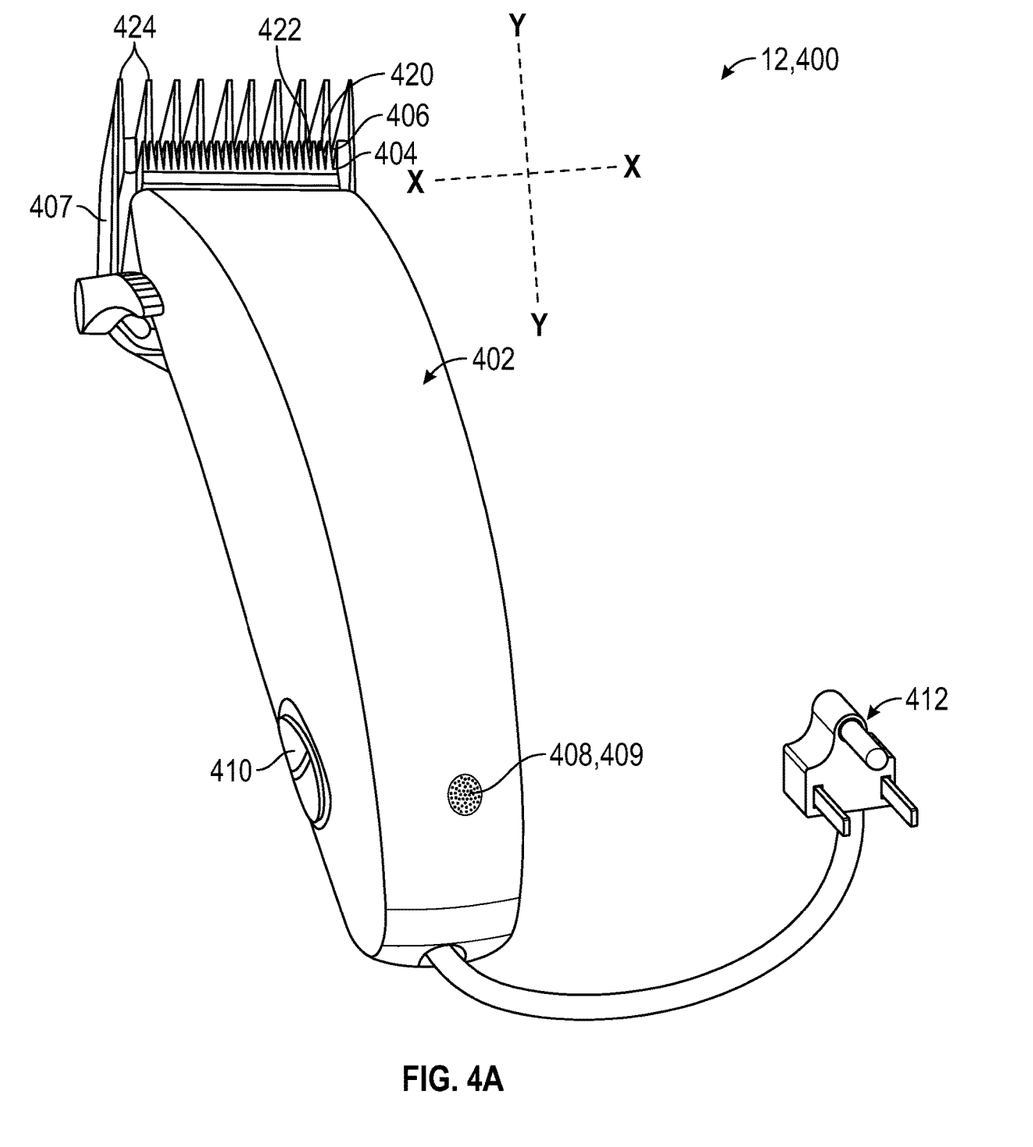
FIG. 4A illustrates an isometric view of an exemplary hair clipping device.

As illustrated in FIG. 4A, the cosmetic device 12 can be a hair clipping device 400. The hair clipping device 400 can be configured to cut and/or trim hair to a desired and/or predetermined length. The hair clipping device 400 includes a housing 402. The hair clipping device 400 includes a first blade 404 and a second blade 406 configured to cut hair. As illustrated in FIG. 4A, hair clipping device 400 includes a guard 407. The guard 407 is configured to control the length of hair that is cut by the first and second blades 404, 406. The guard 407 includes a plurality of guard teeth 424 through which hair can pass by. The guard 407 is translatable along a transverse axis Y-Y. In other examples, the guard 407 can be translatable along an axis oblique to the longitudinal axis X-X or the transverse axis Y-Y. The higher the guard 407 is set, or the further away from the first and second blades 404, 406 the guard 407 is set, the longer the cut hair will be. The lower the guard 407 is set, or the closer to the first and second blades 404, 406 the guard 407 is set, the shorter the cut hair will be. The guard 407 and the guard teeth 424 can abut against skin such that the length of the hair that is cut is determined by the height that the guard 407 is set.

The hair clipping device 400 includes an audio component 408 configured to receive audio input and convert the audio input into audio data. In at least one example, the audio component 408 can be a microphone. In some examples, the audio component 408 can also include a speaker configured to emit a sound, such as confirmation and/or an error notification. While the audio component 408 is illustrated as a single component, it is appreciated it may can include multiple components (e.g., separate respective components for the speaker and the microphone).

The hair clipping device 400 receives energy through a power component 412. The power component 412, as illustrated in FIG. 4A, includes a plug or conduit which can be plugged into a power outlet. In other examples, the power component 412 can include a battery. The battery can be disposed in the housing 402 of the hair clipping device 400.

As illustrated in FIG. 4A, the hair clipping device 400 includes one or more physical controls 410. The one or more physical controls 410 can include switches, buttons, touch screen displays, and/or any other suitable physical control to adjust the settings of the hair clipping device 400. In at least one example, the hair clipping device 400 may not include any physical controls 410 and may be controlled solely through the audio component 408.

Figure 4B:
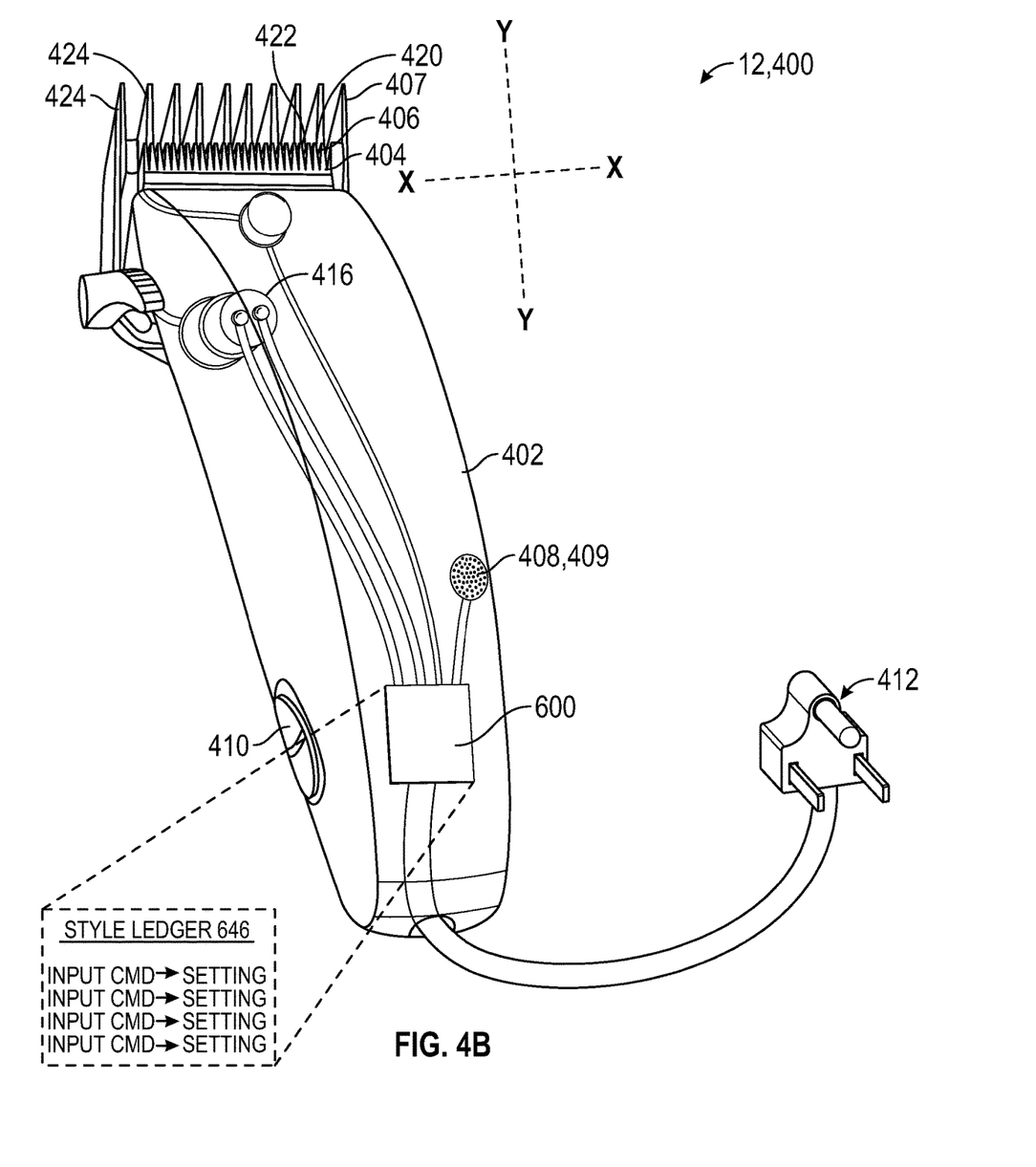
FIG. 4B illustrates an isometric view of the hair clipping device of FIG. 4A, showing one or more internal components.

Referring to FIGS. 4A and 4B, the first blade 404 is stationary such that the first blade 404 does not move. When the hair clipping device 400 is powered on to cut hair, the second blade 406 translates along a longitudinal axis X-X while the first blade 404 remains stationary. The second blade 406 translates in a back and forth motion along the longitudinal axis. In other examples, the first blade 404 may translate while the second blade 406 may remain stationary. In yet other examples, both the first blade 404 and the second blade 406 translate along the longitudinal axis. The hair clipping device 400 can include one or more blade motors 414 to drive the first blade 404 and/or the second blade 406 to translate along the longitudinal axis X-X.

The first blade 404 has blade teeth 420 which are configured to cut hair. Similarly, the second blade 406 has blade teeth 422 which are configured to cut hair. The blade teeth 420, 422 are configured such that when one of the first or second blade 404, 406 translates in relation to the other of the first or second blade 404, 406, hair enters a space between the blade teeth 420, 422. The blade teeth 420, 422 cut the hair as the space between the blade teeth 420, 422 is closed.

In at least one example, the blade motor 414 and the guard motor 416 are the same motor. In other example, the blade motor 414 and the guard motor 416 are separate and distinct motors.

As illustrated in FIG. 4B, the guard 407 is coupled to a guard motor 416. The guard motor 416 is configured to drive the guard 407 to translate along the transverse axis Y-Y. The guard motor 416 can raise the height of the guard 407 and/or lower the height of the guard 407 as desired. In at least one example, the guard 407 is manually translatable along the transverse axis Y-Y.

The audio component 408, the power component 412, the blade motor 414, and the guard motor 416 are communicatively coupled to a controller 600. The controller 600 and corresponding operations are discussed in greater detail with reference to FIG. 6 (below). Notably, as shown here, controller 600 can access a style ledger 646, which may be stored in memory (e.g., in memory 640 discussed below). Style ledger 646 includes instructions related to settings or parameters for the blade motor 414 and the guard motor 416 based on each style setting in the style ledger 646. Based on the instructions corresponding to the style setting, the controller 600 can adjust one or more of the power component 412, the blade motor 414, and the guard motor 416 based on the style setting.

In operation, audio component 408 receives an audio input from a user (e.g., a voice command) and converts the audio input into audio data. The controller 600 receives the audio data from the audio component 408 and determines a corresponding style setting from style ledger 646. The style setting can include at least one of one or more specific speeds, an increase in speed by an amount, a decrease in speed by an amount, one or more specific heights of the guard, an increase in height of the guard by an amount, a decrease in height of the guard by an amount, fine hair, medium hair, coarse hair, thick hair, straight hair, curly hair, wavy hair, long hair, short hair, an on state, an off state, and/or any other suitable style setting to control the hair clipping device 400. The controller 600 can, for example, adjust the power component 412, the blade motor 414, and/or the guard motor 416 based on the style setting. For example, the audio input may be "raise the guard to level 3." The audio component 408 converts the audio input into audio data, which is received by the controller 600. The controller 600 determines that the audio data corresponds to a style setting of a change of the height of the guard 407, and adjusts the guard motor 416 to drive the guard 407 to translate along the transverse axis Y-Y to a height that corresponds with level 3.

When the audio data corresponds to an invalid style setting, an error notification can be transmitted to the speaker 409 based on the invalid style setting. For example, the speaker 409 may emit a noise when the audio data corresponds to an invalid style setting. In other examples, when the audio data corresponds to an invalid style setting, a motor may be actuated to produce a vibration.

Figure 5A:
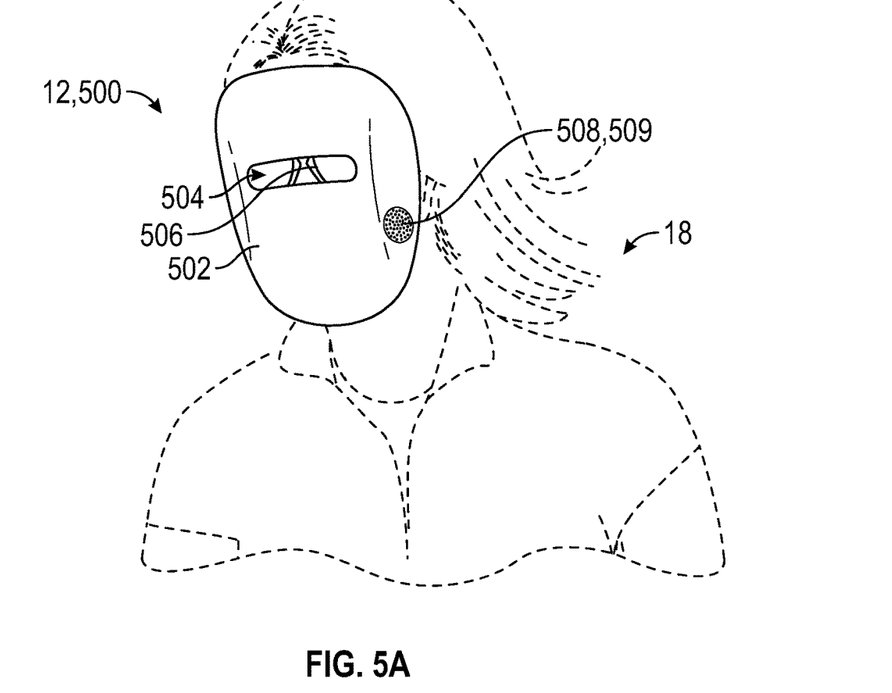
FIG. 5A illustrates an isometric view of an exemplary skin care device according to the disclosure herein.

As illustrated in FIG. 5A, the cosmetic device 12 can be a skin care device 500. The skin care device 500 can treat the skin to alleviate wrinkling, acne, inflammation, and/or other suitable skin ailments. The skin care device 500 can include a housing 502. The housing 502, as illustrated in FIG. 5A, is placed on and/or in proximity to skin (e.g., the face) of the user 18 and defines an aperture 504 such that the user 18 can maintain visibility. The housing 502 is placed a distance from the skin of the user 18 such that the skin care device 500 can effectively treat the skin. The skin care device 500 can include a support component 506 to maintain the position of the skin care device 500 on the user 18. In at least one example, the skin care device 500 can be portable and not worn on the user 18. For example, the skin care device 500 may not define an aperture 504 or include a support component 506. The skin care device 500 may be hand held such that the skin care device 500 may be held by the user 18 at areas of the skin for treatment. The location of the area of the skin for treatment may be the face as illustrated in FIG. 5A, arms, scalp, back, chest, or any other suitable area of the skin where treatment may be desired.

The skin care device 500 includes an audio component 508 configured to receive audio input and convert the audio input into audio data. In at least one example, the audio component 508 can be a microphone. The skin care device 500 can include a speaker 509 configured to emit a sound, such as an error notification. As illustrated in FIG. 5A, the audio component 508 includes a speaker 509. In other examples, the speaker 509 and the audio component 508 can be separate components.

Figure 5B:
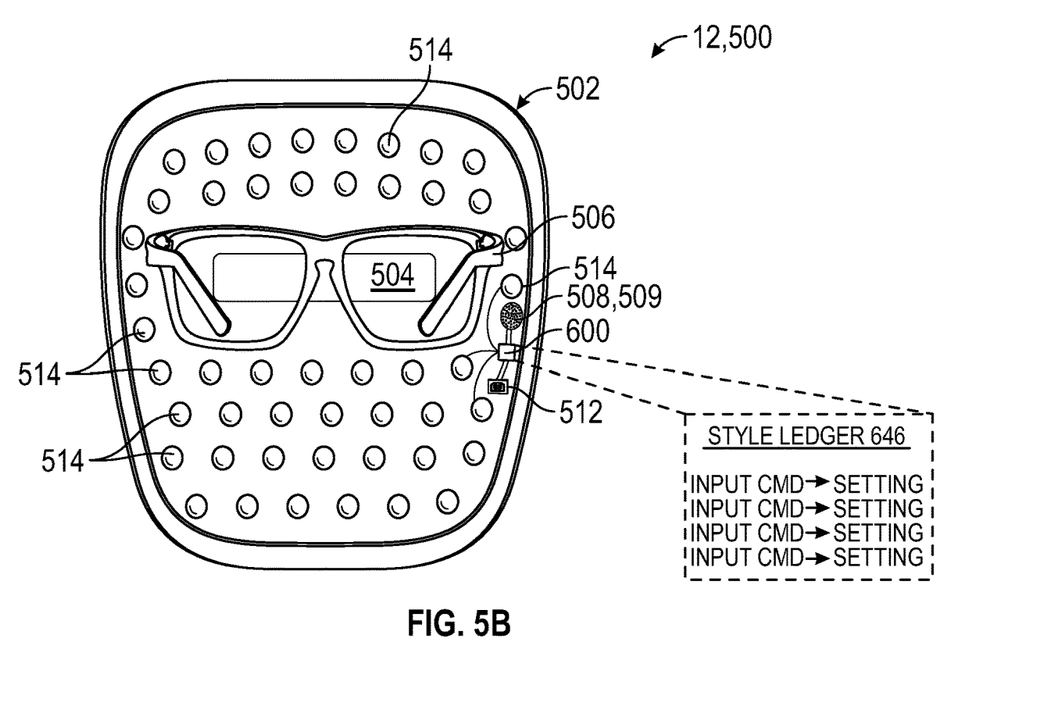
FIG. 5B illustrates a schematic view of the skin care device of FIG. 5A, showing one or more internal components.

As illustrated in FIG. 5B, the skin care device 500 receives energy through a power component 512. The power component 512, as illustrated in FIG. 5B, includes a battery. The battery can be disposed in the housing 502 of the skin care device 500. In other examples, the power component 512 can be a plug which can be plugged into a power outlet.

The skin care device 500 can include a plurality of light sources 514. The light sources 514 can be, for example, light emitting diodes (LEDs). The light sources 514 can emit predetermined wavelengths based on the style setting of treatment desired. For example, the light sources 514 can emit light such as red light, blue light, ultraviolet light, or any other suitable light for skin treatment. For example, red light may reduce acne inflammation, and blue light may target acne causing bacteria. In at least one example, each of the light sources 514 may emit different lights. In at least one example, the controller 600 may control the light sources 514 to emit different lights from the same light source 514. For example, the controller 600 may adjust proportion between the amount of red light and blue light emitted by the light sources 514 based on the desired treatment for the skin. The proportion between the amount of red light and blue light may be adjusted based on the number of the plurality of light sources 514 which emit red light and the number of the plurality of light sources 514 which emit blue light.

The audio component 508, the power component 512, and the plurality of light sources 514 are communicatively coupled to a controller 600. The controller 600 and corresponding operations are discussed in greater detail with reference to FIG. 6 (below). Notably, as shown here, controller 600 can access a style ledger 646, which may be stored in memory (e.g., in memory 640 discussed below). Style ledger 646 includes instructions related to settings or parameters for the power component 512 and the light sources 514 based on each style setting in the style ledger 646. Based on the instructions corresponding to the style setting, the controller 600 can adjust one or more of the power component 512 and the light sources 514 based on the style setting.

In operation, audio component 508 receives an audio input from a user (e.g., a voice command) and converts the audio input into audio data. The controller 600 receives the audio data from the audio component 408 and determines a corresponding style setting from style ledger 646. The style setting can include at least one of one or more light intensities, proportion of colors of light, increase the intensity of a color of light, decrease the intensity of a color of light, color of light, time of treatment, oily skin, dry skin, wrinkles, acne, rosacea, psoriasis, inflammation, an on state, an off state, and/or any other suitable style setting to control the skin care device 500. The controller 600 can, for example, adjust the power component 512 and/or the light sources 514 based on the style setting. For example, the audio input may be "acne treatment." The audio component 508 converts the audio input into audio data, which is received by the controller 600. The controller 600 determines that the audio data corresponds to a style setting of acne treatment, and adjusts the plurality of light sources 514 to emit a proportion of colors and adjusts the power component 512 to provide power to the light sources 514 for a predetermined amount of time to treat acne.

When the audio data corresponds to an invalid style setting, an error notification can be transmitted to the speaker 509 based on the invalid style setting. For example, the speaker 509 may emit a noise when the audio data corresponds to an invalid style setting. In other examples, when the audio data corresponds to an invalid style setting, a motor may be actuated to produce a vibration.

Figure 6:
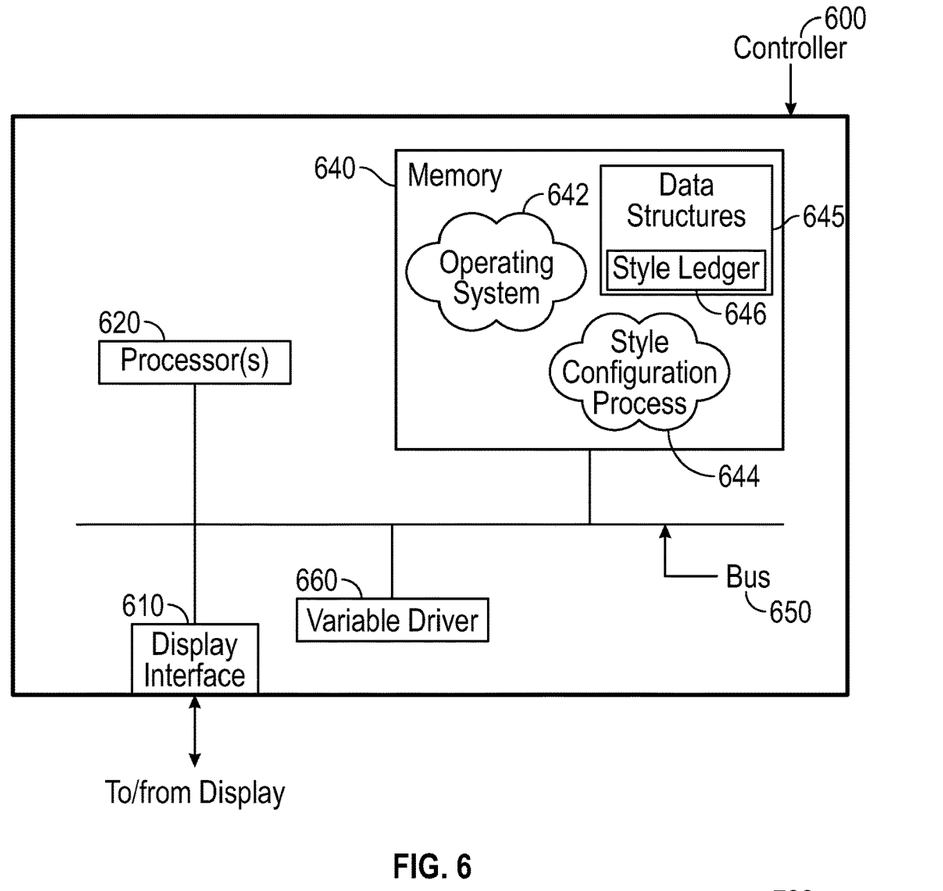
FIG. 6 is a schematic diagram of an exemplary controller according to the disclosure herein.

FIG. 6 is a schematic block diagram of the controller 600 that may be used with one or more examples described herein. The controller 600 may comprise one or more display interfaces 610, at least one processor 620, and a memory 640 interconnected by a system bus 650. As illustrated, the controller 600 includes an optional variable driver 660 to control a drive speed of a motor. Display interface(s) 610 contain the mechanical, electrical, and signaling circuitry for displaying data to a user. In at least one example, display interface(s) may be a portion of external device(s), such as portable devices, desktop computers, laptop computers, and/or tablets. Also, the controller 600 may receive instructions from the external device(s). The external device(s) may be connected to the controller 600 in a wired and/or wireless configuration. Memory 640 comprises a plurality of storage locations that are addressable by processor 620 for storing software programs and data structures 646 associated with the embodiments described herein. Software programs and data structures 646 include one or more style ledgers 646. Style ledgers 646 include a list of style settings. The style settings provide parameters and instructions for adjusting device components of a cosmetic device 12.

Processor 620 may include necessary elements or logic adapted to execute the software programs and manipulate data structures 644. An operating system 642, portions of which are typically resident in memory 640 and executed by processor 620, functionally organizes the controller 600 by, inter alia, invoking operations in support of software processes and/or services executing on the device. These software processes and/or services may comprise an illustrative style configuration process 244. Note that while the style configuration process 644 is shown in centralized memory 640, some examples provide for these processes/services to be operated in a distributed wireless network.

Other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 620 can include one or more programmable processors, e.g., microprocessors or microcontrollers, or fixed-logic processors. In the case of a programmable processor, any associated memory, e.g., memory 640, may be any type of tangible processor readable memory, e.g., random access, read-only, etc., that is encoded with or stores instructions that can implement program modules, e.g., a module having data structures 646 and/or style ledgers 646 encoded thereon. Processor 620 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 7:
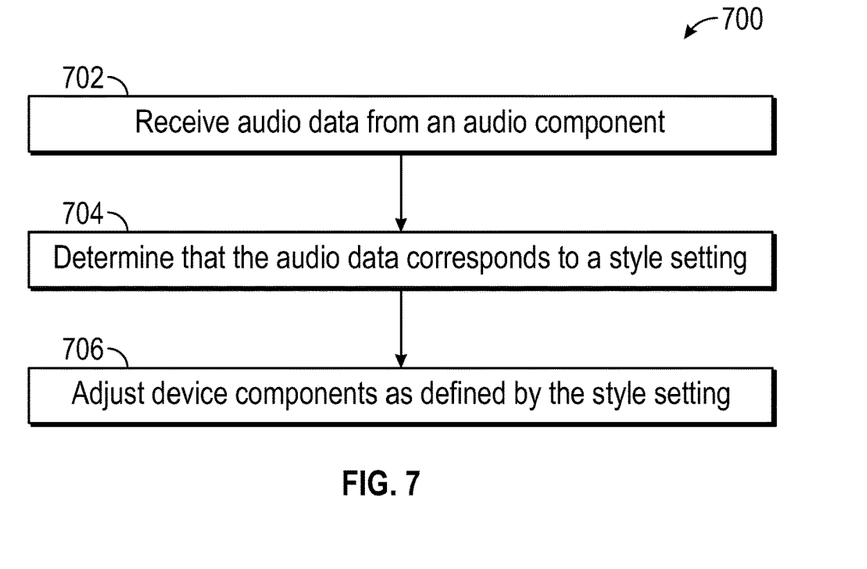
FIG. 7 is a flow chart of a method for controlling a cosmetic device according to the disclosure herein.

Referring to FIG. 7, a flowchart is presented in accordance with an example embodiment. The method 700 is provided by way of example, as there are a variety of ways to carry out the method. The method 700 described below can be carried out using the configurations illustrated in FIGS. 1-6, for example, and various elements of these figures are referenced in explaining example method 700. Each block shown in FIG. 7 represents one or more processes, methods, or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, a controller disposed in a cosmetic device receives audio data from an audio component included in the cosmetic device. The audio component receives audio input and processes the audio input into audio data. The cosmetic device can be, for example, a hair drying device, a styling iron device, a hair clipping device, a skin care device, and/or any other suitable cosmetic device. The cosmetic device includes one or more device components, such as motors, light sources, and power components. The audio component may be, for example, a microphone.

At block 704, the controller determines that the audio data corresponds to a style setting. The style setting can include parameters, programs, and/or instructions to adjust the device components of the cosmetic device. For example, the style setting can include type of hair property, increase or decrease a speed of a motor, on state, off state, or any other suitable style setting such that the cosmetic device is utilized as desired. When the audio data corresponds to an invalid style setting, an error notification can be emitted. For example, the cosmetic device may include a speaker, and when the audio data corresponds to an invalid style setting, a sound may be emitted through the speaker.

At block 706, when the audio data corresponds to a style setting, the controller adjusts the device components based on the style setting. For example, if the audio data corresponds to the style setting "turn off," the controller adjusts the power component to an off state.

The cosmetic device may also include one or more sensors configured to determine parameters of the device components. The sensors can be communicatively coupled with the controller, such that the controller can adjust the device component until the parameters of the device component is equal to the parameters based on the style setting.

Numerous examples are provided herein to enhance understanding of the present disclosure. A specific set of statements are provided as follows:

Statement 1: A hair drying device is disclosed comprising: a housing having an air inlet and an air outlet; a power component; a heating element coupled to the power component, the heating element is configured to radiate heat into air passing from the air inlet through the air outlet based on energy provided by the power component; an audio component configured to receive audio input and convert the audio input into audio data; a controller in communication with the heating element and the audio component; and a memory configured to store instructions executable by the controller, the instructions, when executed, are operable to: receive the audio data from the audio component; determine that the audio data corresponds to a style setting; and adjust the energy provided by the power component to increase or decrease the heat emitted by the heating element based on the style setting.

Statement 2: A hair drying device is disclosed according to Statement 1, wherein the style setting includes at least one of one or more specific temperatures, a change in temperature by a number of degrees, fine hair, medium hair, coarse hair, thick hair, straight hair, curly hair, wavy hair, long hair, short hair, an on state, and an off state.

Statement 3: A hair drying device is disclosed according to Statements 1 or 2, further comprising a sensor coupled to the controller, the sensor is configured to determine a temperature of the air passing through the air outlet; the instructions, when executed by the controller, are further operable to: adjust, when the temperature is not equal to a predetermined temperature based on the style setting, the energy provided by the power component until the temperature is equal to the predetermined temperature.

Statement 4: A hair drying device is disclosed according to any of preceding Statements 1-3, wherein the heating element includes a wire, the energy provided by the power component is passed through the wire to generate the heat.

Statement 5: A hair drying device is disclosed according to Statement 4, wherein adjusting the energy provided by the power component includes increasing or decreasing electric current that passes through the wire.

Statement 6: A hair drying device is disclosed according to any of preceding Statements 1-5, further comprising: a motor in communication with the controller disposed within the housing; and an impeller coupled to the motor, the motor is configured to rotationally drive the impeller to propel air from the air inlet through the air outlet; the instructions, when executed by the controller, are further operable to: adjust a speed of the motor to rotationally drive the impeller based on the style setting.

Statement 7: A hair drying device is disclosed according to Statement 6, wherein the controller comprises: a processor coupled to the memory; and a variable speed driver coupled to the motor, the variable speed driver is operable to adjust the speed of the motor.

Statement 8: A hair drying device is disclosed according to Statements 6 or 7, wherein the style setting includes at least one of one or more specific speeds, a change in speed by an amount, fine hair, medium hair, coarse hair, thick hair, straight hair, curly hair, wavy hair, long hair, short hair, an on state, and an off state.

Statement 9: A hair drying device is disclosed according to any of preceding Statements 6-8, further comprising a sensor coupled to the controller, the sensor is configured to determine the speed of the motor; the instructions, when executed by the controller, are operable to: adjust, when the speed of the motor is not equal to a predetermined speed based on the style setting, the speed of the motor until the speed of the motor is equal to the predetermined speed.

Statement 10: A hair drying device is disclosed according to any of preceding Statements 1-9, further comprising a speaker, wherein the instructions, when executed by the controller to determine the audio data corresponds to a style setting, are further operable to: determine the audio data corresponds to an invalid style setting; and transmit an error notification to the speaker based on the invalid style setting.

Statement 11: A hair drying device is disclosed comprising: a housing having an air inlet and an air outlet; a motor disposed within the housing; an impeller coupled to the motor, the motor is configured to rotationally drive the impeller to propel air from the air inlet through the air outlet; an audio component configured to receive audio input and convert the audio input into audio data; a controller in communication with the motor and the audio component; and a memory configured to store instructions executable by the controller, the instructions, when executed, are operable to: receive the audio data from the audio component; determine that the audio data corresponds to a style setting; and adjust a speed of the motor to rotationally drive the impeller based on the style setting.

Statement 12: A hair drying device is disclosed according to Statement 11, wherein the controller comprises: a processor coupled to the memory; and a variable speed driver coupled to the motor, the variable speed driver is operable to adjust the speed of the motor.

Statement 13: A hair drying device is disclosed according to Statements 11 or 12, wherein the style setting includes at least one of one or more specific motor speeds, a change in motor speed by an amount, fine hair, medium hair, coarse hair, thick hair, straight hair, curly hair, wavy hair, long hair, short hair, an on state, and an off state.

Statement 14: A hair drying device is disclosed according to any of preceding Statements 11-13, further comprising a sensor coupled to the controller, the sensor is configured to determine the speed of the motor; the instructions, when executed by the controller, are further operable to: adjust, when the speed of the motor is not equal to a predetermined speed based on the style setting, the speed of the motor until the speed of the motor is equal to the predetermined speed.

Statement 15: A hair drying device is disclosed according to any of preceding Statements 11-14, further comprising: a power component; a heating element coupled to the power component, the heating element is configured to radiate heat into air passing through the air inlet and the air outlet based on energy provided by the power component; the instructions, when executed by the controller, are further operable to: adjust the energy provided by the power component to increase or decrease the heat emitted by the heating element based on the style setting.

Statement 16: A hair drying device is disclosed according to Statement 15, wherein the style setting includes at least one of one or more specific speeds, a change in speed by an amount, fine hair, medium hair, coarse hair, thick hair, straight hair, curly hair, wavy hair, long hair, short hair, an on state, and an off state.

Statement 17: A hair drying device is disclosed according to Statements 15 or 16, further comprising a sensor coupled to the controller, the sensor is configured to determine a temperature of the air passing through the air outlet; the instructions, when executed by the controller, are further operable to: adjust, when the temperature is not equal to a predetermined temperature based on the style setting, the energy provided by the power component until the temperature is equal to the predetermined temperature.

Statement 18: A hair drying device is disclosed according to any of preceding Statements 15-17, wherein the heating element includes a wire, the energy provided by the power component is passed through the wire to generate the heat.

Statement 19: A hair drying device is disclosed according to Statement 18, wherein adjusting the energy provided by the power component includes increasing or decreasing electric current that passes through the wire.

Statement 20: A hair drying device is disclosed according to any of preceding Statements 11-19, further comprising a speaker, wherein the instructions, when executed by the controller to determine the audio data corresponds to a style setting, are further operable to: determine the audio data corresponds to an invalid style setting; and transmit an error notification to the speaker based on the invalid style setting.

Statement 21: A hair drying device is disclosed comprising: a housing having an air inlet and an air outlet; an ionic generator disposed in the housing, the ionic generator is configured to emit an amount of ions into air passing from the air inlet through the air outlet; an audio component configured to receive audio input and convert the audio input into audio data; a controller in communication with the ionic generator and the audio component; and a memory configured to store instructions executable by the controller, the instructions, when executed, are operable to: receive the audio data from the audio component; determine that the audio data corresponds to a style setting; and adjust the ionic generator to increase or decrease the amount of ions emitted by the ionic generator based on the style setting.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A hair drying device comprising:
    a housing having an air inlet and an air outlet;
    a power component;
    a heating element coupled to the power component, the heating element is configured to radiate heat into air passing from the air inlet through the air outlet based on energy provided by the power component;
    an audio component configured to receive audio input and convert the audio input into audio data;
    a speaker;
    a controller in communication with the heating element and the audio component; and
    a memory configured to store instructions executable by the controller, the instructions, when executed, are operable to:
        receive the audio data from the audio component;
        determine that the audio data corresponds to a style setting;
        adjust the energy provided by the power component to increase or decrease the heat emitted by the heating element based on the style setting;
        determine that the audio data corresponds to an invalid style setting; and
        transmit an error notification to the speaker, the error notification being based on the invalid style setting,
    wherein the style setting includes an on state and an off state.

2. The hair drying device of claim 1, wherein the style setting includes at least one of fine hair, medium hair, coarse hair, thick hair, straight hair, curly hair, wavy hair, long hair, and short hair.

3. The hair drying device of claim 1, further comprising a sensor coupled to the controller, the sensor is configured to determine a temperature of the air passing through the air outlet; the instructions, when executed by the controller, are further operable to:
    adjust, when the temperature is not equal to a predetermined temperature based on the style setting, the energy provided by the power component until the temperature is equal to the predetermined temperature.

4. The hair drying device of claim 1, wherein the heating element includes a wire, the energy provided by the power component is passed through the wire to generate the heat.

5. The hair drying device of claim 4, wherein adjusting the energy provided by power component includes increasing or decreasing electric current that passes through the wire.

6. The hair drying device of claim 1, further comprising:
    a motor in communication with the controller disposed within the housing; and
    an impeller coupled to the motor, the motor is configured to rotationally drive the impeller to propel air from the air inlet through the air outlet; the instructions, when executed by the controller, are further operable to:
        adjust a speed of the motor to rotationally drive the impeller based on the style setting.

7. The hair drying device of claim 6, wherein the controller comprises:
    a processor coupled to the memory; and
    a variable speed driver coupled to the motor, the variable speed driver is operable to adjust the speed of the motor.

8. The hair drying device of claim 6, wherein the style setting includes at least one of fine hair, medium hair, coarse hair, thick hair, straight hair, curly hair, wavy hair, long hair, and short hair.

9. The hair drying device of claim 6, further comprising a sensor coupled to the controller, the sensor is configured to determine the speed of the motor; the instructions, when executed by the controller, are further operable to:
    adjust, when the speed of the motor is not equal to a predetermined speed based on the style setting, the speed of the motor until the speed of the motor is equal to the predetermined speed.

10. A hair drying device comprising:
    a housing having an air inlet and an air outlet;
    a motor disposed within the housing;
    an impeller coupled to the motor, the motor is configured to rotationally drive the impeller to propel air from the air inlet through the air outlet;
    an audio component configured to receive audio input and convert the audio input into audio data;
    a speaker;
    a controller in communication with the motor and the audio component; and
    a memory configured to store instructions executable by the controller, the instructions, when executed, are operable to:
        receive the audio data from the audio component;
        determine that the audio data corresponds to a style setting;
        adjust a speed of the motor to rotationally drive the impeller based on the style setting;
        determine that the audio data corresponds to an invalid style setting; and
        transmit an error notification to the speaker, the error notification being based on the invalid style setting,
    wherein the style setting includes an on state and an off state.

11. The hair drying device of claim 10, wherein the controller comprises:
    a processor coupled to the memory; and
    a variable speed driver coupled to the motor, the variable speed driver is operable to adjust the speed of the motor.

12. The hair drying device of claim 10, wherein the style setting includes at least one of fine hair, medium hair, coarse hair, thick hair, straight hair, curly hair, wavy hair, long hair, and short hair.

13. The hair drying device of claim 10, further comprising a sensor coupled to the controller, the sensor is configured to determine the speed of the motor; the instructions, when executed by the controller, are further operable to:
    adjust, when the speed of the motor is not equal to a predetermined speed based on the style setting, the speed of the motor until the speed of the motor is equal to the predetermined speed.

14. The hair drying device of claim 10, further comprising:

a power component;

a heating element coupled to the power component, the heating element is configured to radiate heat into air passing between the air inlet and the air outlet based on energy provided by the power component; the instructions, when executed by the controller, are further operable to:

adjust the energy provided by the power component to increase or decrease the heat emitted by the heating element based on the style setting.

15. The hair drying device of claim 14, wherein the style setting includes at least one of fine hair, medium hair, coarse hair, thick hair, straight hair, curly hair, wavy hair, long hair, and short hair.

16. The hair drying device of claim 14, further comprising a sensor coupled to the controller, the sensor is configured to determine a temperature of the air passing through the air outlet; the instructions, when executed by the controller, are further operable to:

adjust, when the temperature is not equal to a predetermined temperature based on the style setting, the energy provided by the power component until the temperature is equal to the predetermined temperature.

17. The hair drying device of claim 14, wherein adjusting the energy provided by the power component includes increasing or decreasing electric current that passes through a wire.

18. A hair drying device comprising:

a housing having an air inlet and an air outlet;

an ionic generator disposed in the housing, the ionic generator is configured to emit an amount of ions into air passing from the air inlet through the air outlet;

an audio component configured to receive audio input and convert the audio input into audio data;

a speaker;

a controller in communication with the ionic generator and the audio component; and a memory configured to store instructions executable by the controller, the instructions, when executed, are operable to:

receive the audio data from the audio component;

determine that the audio data corresponds to a style setting;

adjust the ionic generator to increase or decrease the amount of ions emitted by the ionic generator based on the style setting;

determine that the audio data corresponds to an invalid style setting; and transmit an error notification to the speaker, the error notification being based on the invalid style setting, wherein the style setting includes an on state and an off state.

* * * * *